(12) United States Patent
Evans (10) Patent No.: US 8,095,520 B2
(45) Date of Patent: Jan. 10, 2012

(54) EVENT RECORDING WITH LOCAL EVENT RECORD LOCKING

(75) Inventor: Neil D. Evans, North Chelmsford, MA (US)

(73) Assignee: Oracle International Corporation, Redwood Shores, CA (US)

( * ) Notice: Subject to any disclaimer, the term of this patent is extended or adjusted under 35 U.S.C. 154(b) by 515 days.

(21) Appl. No.: 12/290,718

(22) Filed: Nov. 3, 2008

(65) Prior Publication Data

US 2010/0114850 A1   May 6, 2010

(51) Int. Cl.
*G06F 7/00* (2006.01)
(52) U.S. Cl. ........ 707/704; 707/755; 707/737; 707/803; 707/701; 707/702; 707/703
(58) Field of Classification Search .............. 707/755, 707/737, 803, 701–704
See application file for complete search history.

(56) References Cited

U.S. PATENT DOCUMENTS

| 7,043,566 | B1 * | 5/2006 | Grant et al. ................... 719/323 |
| 7,747,591 | B2 * | 6/2010 | Chatterjee et al. ............ 707/704 |
| 2003/0004952 | A1 * | 1/2003 | Nixon et al. .................... 707/10 |
| 2006/0288037 | A1 * | 12/2006 | Sundararajan et al. ....... 707/102 |
| 2010/0088683 | A1 * | 4/2010 | Golender et al. ............ 717/128 |

* cited by examiner

*Primary Examiner* — Apu Mofiz
*Assistant Examiner* — Cindy Nguyen
(74) *Attorney, Agent, or Firm* — Kraguljac & Kalnay, LLC (57) ABSTRACT

Systems, methods, and other embodiments associated with event recording are described. One example method includes locally locking a record in an event data store corresponding to an event having a same event type as a given event when a prior occurrence of the given event has not yet been recorded. The event data store is updated to record the given event while the record is locked. One example system includes an event data store configured to store records corresponding to events, an event recorder configured to record event data in the event data store and a local lock actuable by the event recorder. The event recorder is configured to update the locked record to correspond to a received event.

28 Claims, 7 Drawing Sheets

| USER ID | OBJECT | TYPE | TIME STAMP |
|---|---|---|---|
| USER A | MAIL173 | MAIL | 0098573 |
| USER A | MAIL163 | MAIL | 0092553 |
| USER A | MAIL109 | MAIL | 0115962 |
| USER A | MAIL112 | MAIL | 0000027 |
| USER A | MAIL189 | MAIL | 1155899 |
| USER A | MAIL005 | MAIL | 2236821 |
| USER A | MAIL225 | MAIL | 0025468 |
| USER A | MAIL089 | MAIL | 0952324 |
| USER A | MAIL237 | MAIL | 0596327 |
| USER A | MAIL154 | MAIL | 3478597 |
| USER A | MAIL369 | MAIL | 0098575 |
| USER A | DOC369 | DOC | 0098575 |
| USER A | DOC009 | DOC | 0542685 |
| USER A | DOC127 | DOC | 0095142 |
| USER B | MAIL257 | MAIL | 0785469 |
| USER B | MAIL334 | MAIL | 0000564 |
| USER B | DOC406 | DOC | 2335691 |
| USER B | PIC798 | PIC | 0098573 |

{USER A,MAIL173,MAIL,3705641}
A

{USER A,DOC405,DOC,3564444}
B

{USER A,MAIL965,MAIL,3725657}
C

{USER A,PIC295,PIC,4156798}
D

EVENT RECORDING WITH LOCAL EVENT RECORD LOCKING

BACKGROUND

Many computer operating environments track events, such as, for example, the access of various software entities ("objects") by each user in the operating environment. One reason for tracking user-to-object access events is to enable the capability of supplying to a given user a list of objects that have been recently accessed by the user ("recent artifacts"). When a user desires to access an object, often the desired object has been recently accessed by the user and will be included in the list of recent artifacts. In this case, the user may conveniently select the object from the list of recent artifacts rather than searching and locating the object in another manner.

Systems that maintain the list of recent artifacts such as, for example, user-to-object access events, often do so by way of a relational database. The user-to-object accesses are made concurrently, so that the system that maintains the database should be able to handle accesses that occur simultaneously or near-simultaneously while ensuring that every access is processed for recording. The processing of the concurrent user-to-object accesses should be accomplished without overly degrading the performance of the system. In addition, as the multiple users access various objects the list of recent artifacts grows, causing the list to occupy an increasing amount of memory.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

In the following description, methods and systems for event recording are described. For the purposes of this description, the events that are recorded comprise user-to-object access events. It will be apparent to one of skill in the art that the methods and systems described herein may also be employed in any instance where it is desired to record the occurrence of events.

In various embodiments, the event recording systems and methods described herein employ a local lock on the data store of events rather than a lock on the entire data store to address the concerns discussed above. A culling feature may also be included in one embodiment that deletes records from the data store when the number of events of a certain type exceeds a predetermined limit.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Query", as used herein, refers to a semantic construction that facilitates gathering and processing information. A query may be formulated in a database query language (e.g., SQL), an OQL, a natural language, and so on.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Figure 1A:
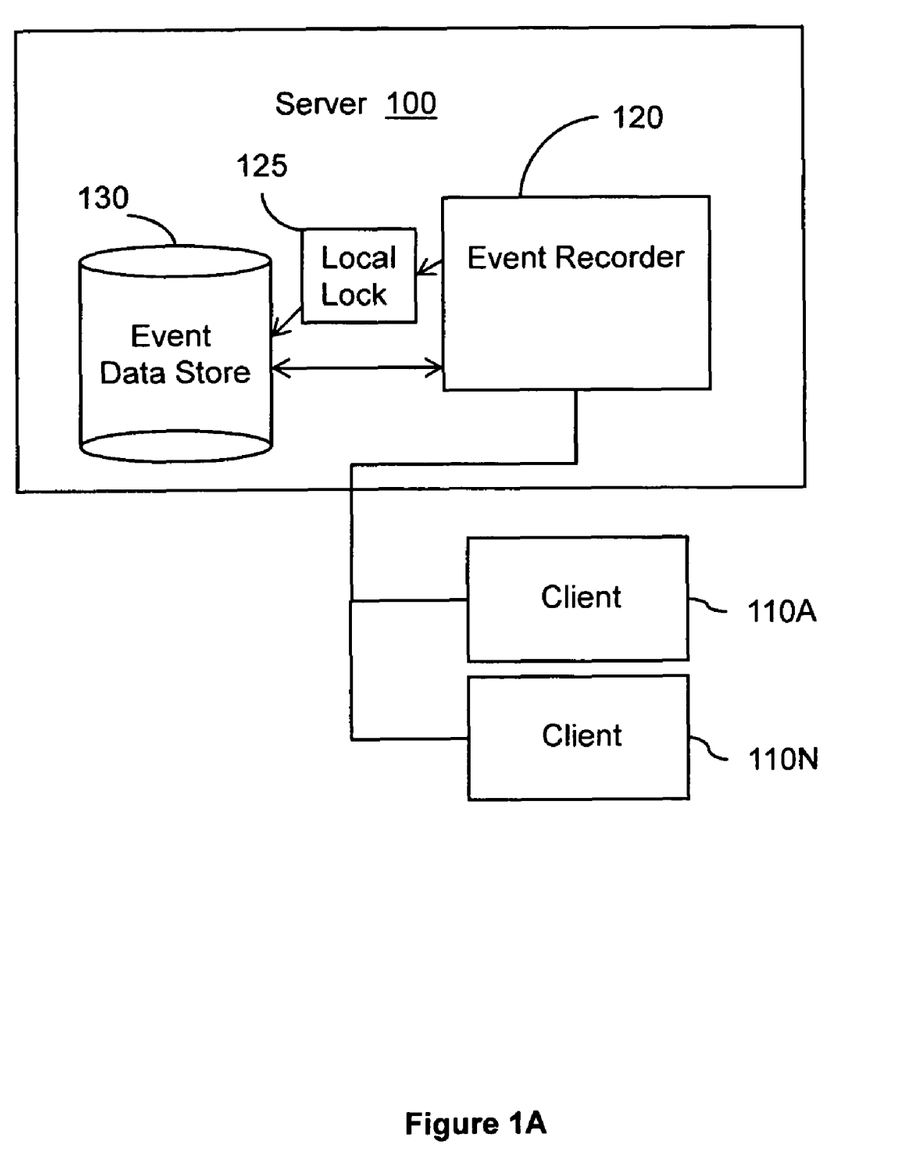
FIGS. 1A and 1B illustrate embodiments of a system associated with recording events.
Figure 1B:
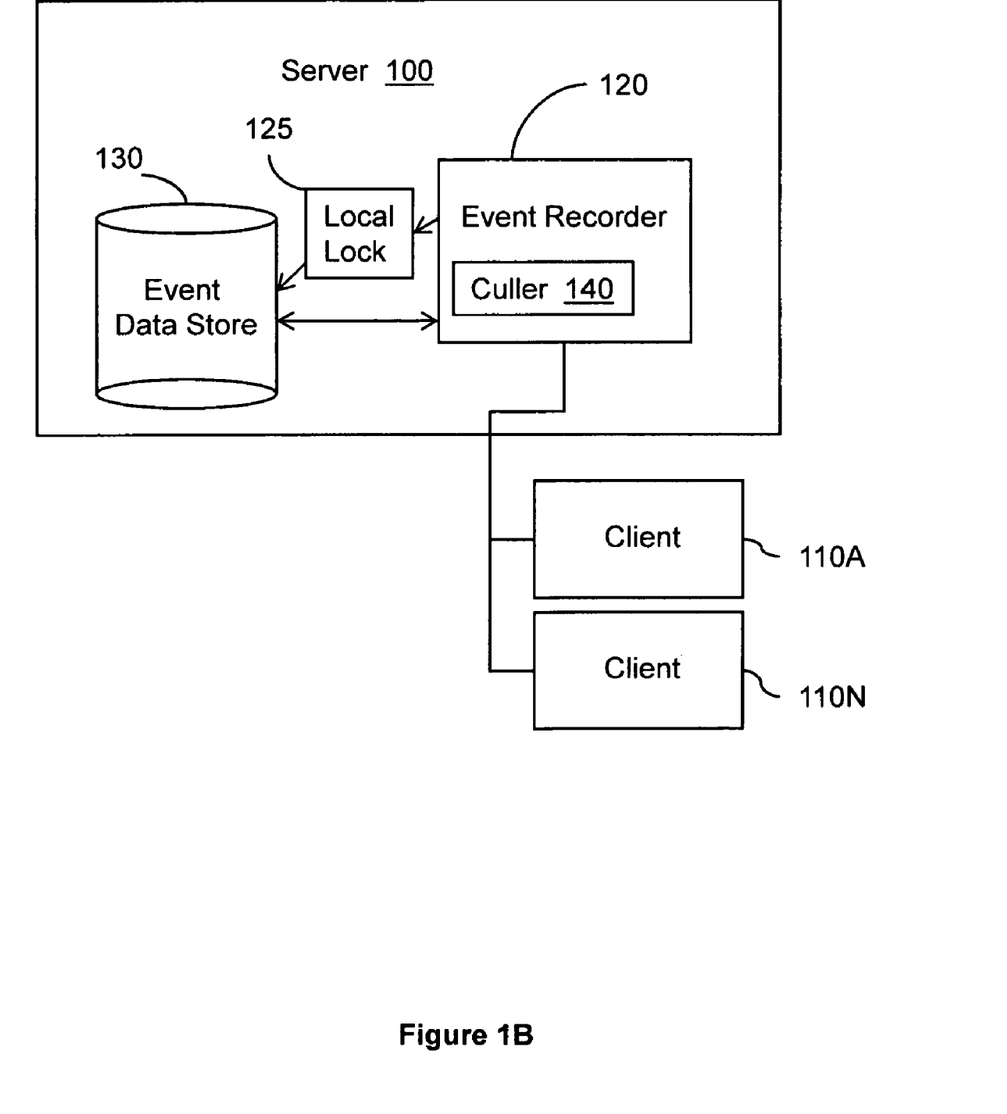

FIGS. 1A and 1B are functional block diagrams of embodiments of a system that records events as records in an event data store 130, where each event is classified by an event identifier and an event type. The event data store 130 is configured to store records where each record corresponds to an event. An event recorder 120 is configured to receive event data related to a received event and to record the event data as a record in the event data store 130. A local lock 125 is actuable by the event recorder 120. In one embodiment the local lock is configured to locally lock a least recent record identified as having a same event type as the received event. The event recorder is configured to update the locked record to correspond to the received event.

The system is shown as residing on a server 100, but the system could be implemented by way of a remote device or other component. The server 100 processes the accesses of multiple clients 110A-N to various software components handled by the server. The event recorder 120 monitors access to software objects by the clients 110A-N and compiles a list of recent artifacts that can be provided to the clients. The event data store 130 is accessible to the event recorder 120 and stores the user-to-object accesses processed by the event recorder 120. The event data store 130 may store, for example, one or more relational database tables, such as the one shown in FIG. 2, that have tuples or rows that each correspond to a user-to-object access. When a client 110 requests a recent artifact list, the event recorder 120 queries the event data store 130 to compile the list.

In one embodiment, the event recorder 120 maintains the records in the event data store 130 by processing user-to-object accesses performed by the clients 110. The event recorder 120 updates the records by inserting, deleting and/or modifying the records to reflect the ongoing user-to-object accesses. To perform an update, the event recorder 120 is configured to actuate the local lock 125 to lock a selected record in the event data store without locking the entire data store. The locking is performed in certain instances as will be described in more detail below. In one embodiment, the event recorder can include a culler 140 (FIG. 1B) that deletes selected records from the table to reduce the table's size.

In one embodiment, access to other records in the event data 130 store is allowed while the identified least recent record is locally locked. In one embodiment, the event recorder 120 is configured to insert a new record into the event data store when no record corresponding to an event having the same event type as the received event is present in the event data store 130. In one embodiment, the event recorder 120 is configured to update a record corresponding to a prior occurrence of the received event when a record for a prior occurrence of the received event is present in the event data store 130.

Figure 2:
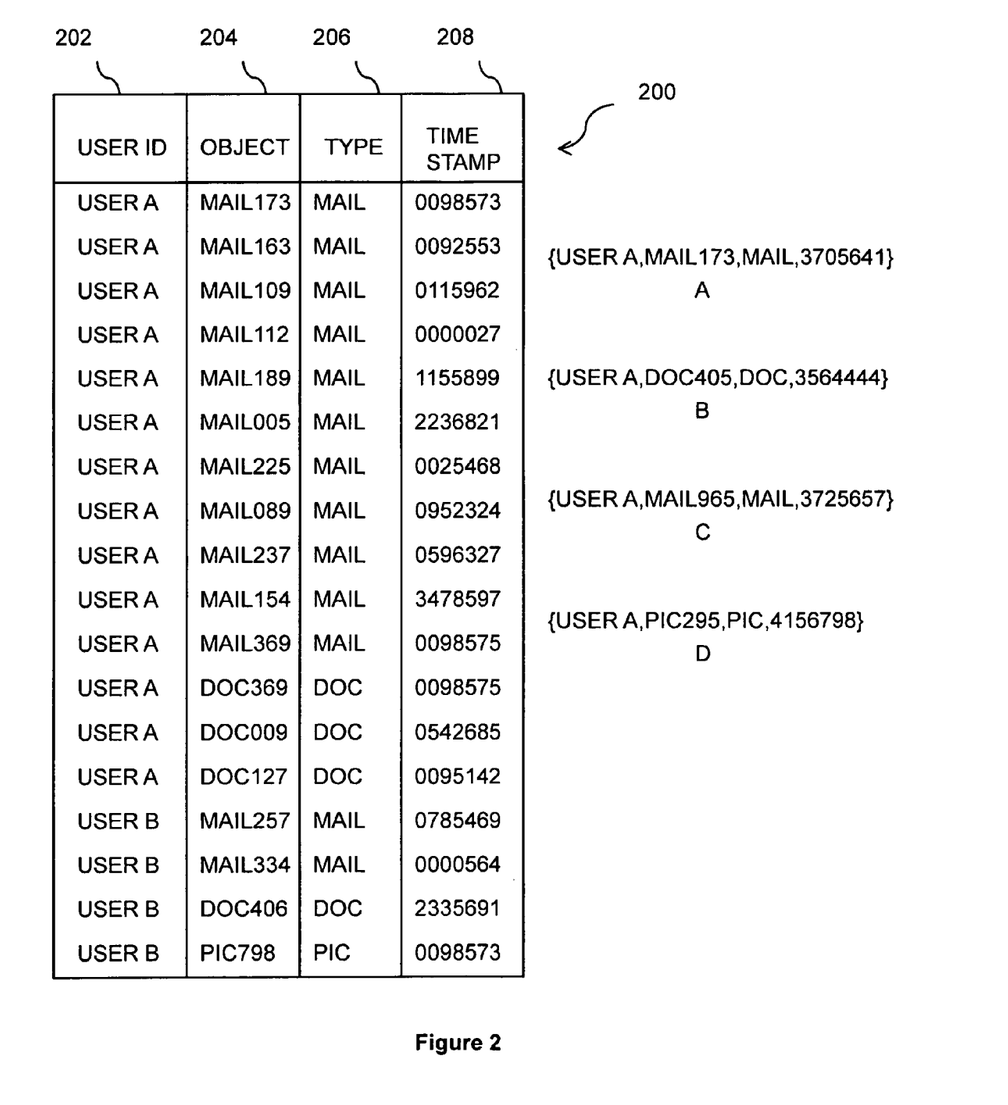
FIG. 2 illustrates an example embodiment of an event table.

In one embodiment the events are user-to-object accesses. The event data store 130 includes an object access table having attributes corresponding to a user identifier, object identifier, object type, and a time stamp for the user-to-object access (FIG. 2). The local lock 125 is configured to locally lock a row in the object access table having the same user identifier and object type as the received event and where the event recorder 120 is configured to modify the locked row such that it corresponds to the event data of the received event.

In one embodiment, the event recorder 120 includes an event data store culler 140 (FIG. 1B) configured to count a number of records having the same event type as the received event and to delete at least one record if the number of records is equal to or exceeds a predetermined limit. The use of the data store culler 140 helps to limit the overall size of the event table so that it does not become arbitrarily large as more events occur.

In one embodiment, the data store culler is configured to delete at least one record in the counted records corresponding to a least recent event.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 2 illustrates an embodiment of an event table 200 that is stored in the event data store 130 (FIG. 1) and maintained by the event recorder 120 (FIGS. 1A and 1B). The table 200 records user-to-object access events. The event table has four attributes or columns USER ID 202, OBJECT 204, TYPE 206 and TIMESTAMP 208, although other columns can be used. Each record is stored as a row in the table and corresponds to a unique user-to-object access. In one embodiment, the primary key of the table is a joint key on the USER ID, OBJECT columns, so that every USER ID, OBJECT pair would be unique in the table. The columns can be marked non null such that they should contain data.

In the example of FIG. 2, the event table 200 has recorded 14 user-to-object access events for USER A as the first 14 rows of the table. Eleven of the rows correspond to an access by USER A having TYPE "MAIL". Each of these 11 rows corresponds to a most recent access of a different OBJECT of TYPE "MAIL" for USER A, i.e. MAIL 173, MAIL 163, MAIL 109, etc. Three of the rows correspond to an access by USER A to having TYPE "DOC". Each row includes a value in TIMESTAMP for when the recorded user-to-object access occurred. In one embodiment, a constraint can be put on the table to limit on the number of user-to-object accesses that should be recorded for any given pair of USER ID, TYPE values. For the purposes of this description, the limit on the number of records of any given type will be 10. Of course, other limits can be implemented.

In one example, data structures may be constructed that facilitate storing data on a computer-readable medium and/or in a data store. Thus, in one example, a computer-readable medium may store a data structure that includes, a first field for data associated with a user identification, a second field for data associated with an object identifier, a third field for data associated with an object type, and a fourth field for data associated with a user-to-object access timestamp. While four fields are described, it is to be appreciated that a greater and/or lesser number of fields could be employed.

Figure 3:
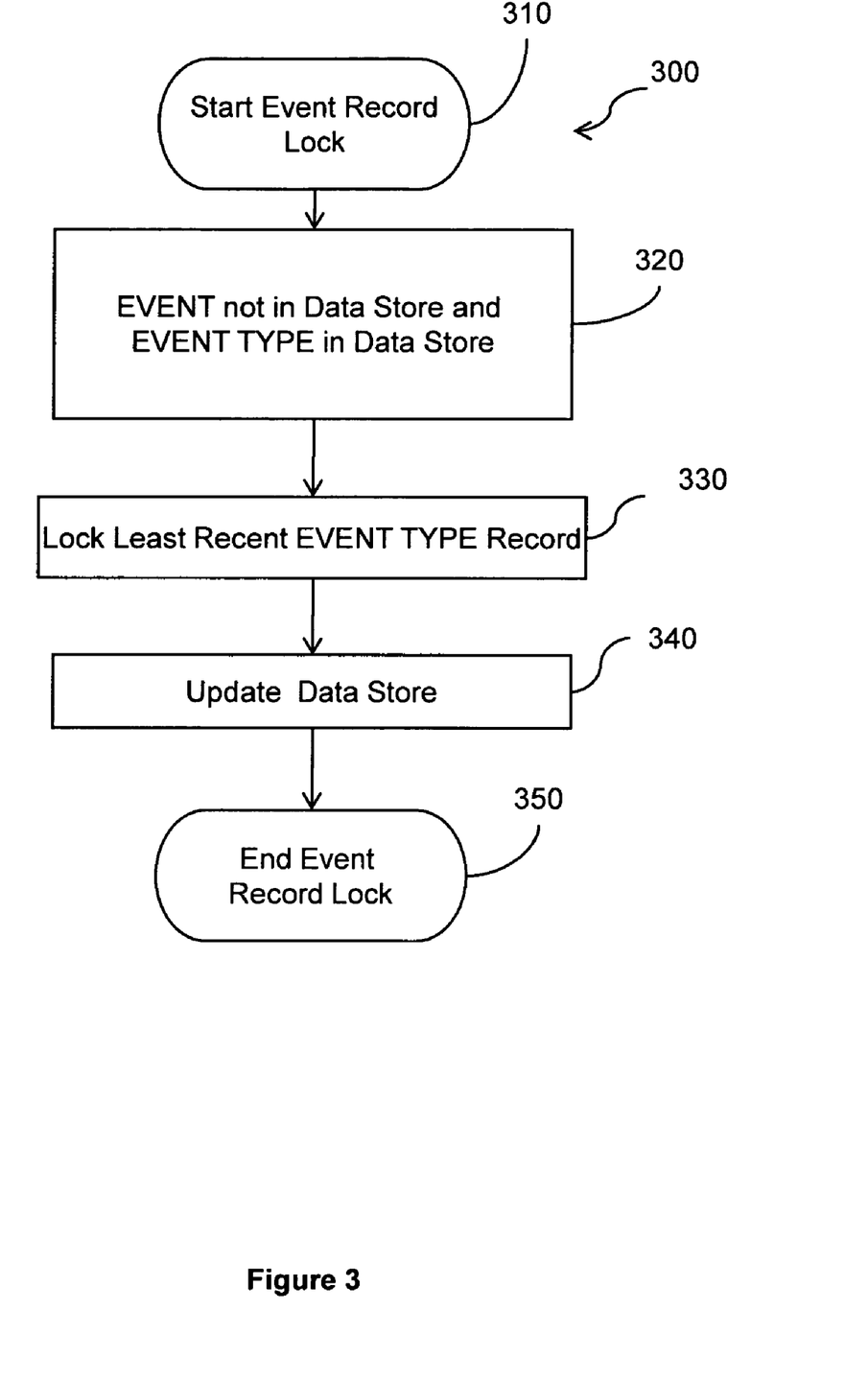
FIG. 3 illustrates an example method associated with recording events.

FIG. 3 illustrates an event record lock method 300 that locks a selected record in the event data store 130. At 310 if the event is not in the data store, the method begins. At 320 it is determined that a prior occurrence of the received event is not in the data store, and at least one record is identified in the data store as corresponding to an event of the same event type. At 330 the least recent record having the same event type is locked. At 340, the data store is updated while the record is locked to record the event being processed. The updating of the data store includes, for example, a new record insertion or an update/overwrite of the least recent record. At 350 the event record lock ends. This localized lock allows other clients/processes to access other records in the database while the locked record is being updated. In the described embodiment, the effective scope of the lock is that operations are locked for a specific user, type pair. Enhanced performance can be achieved because processes not accessing the locked record may continue to operate while the data store is being updated.

In one embodiment, the event recorder 120 (FIG. 1) actuates the local lock 125 (FIG. 1) to perform the method 300 when a received event is processed for recording for the first time, meaning that no record for a prior occurrence of that particular event is present in the data store.

Figure 4A:
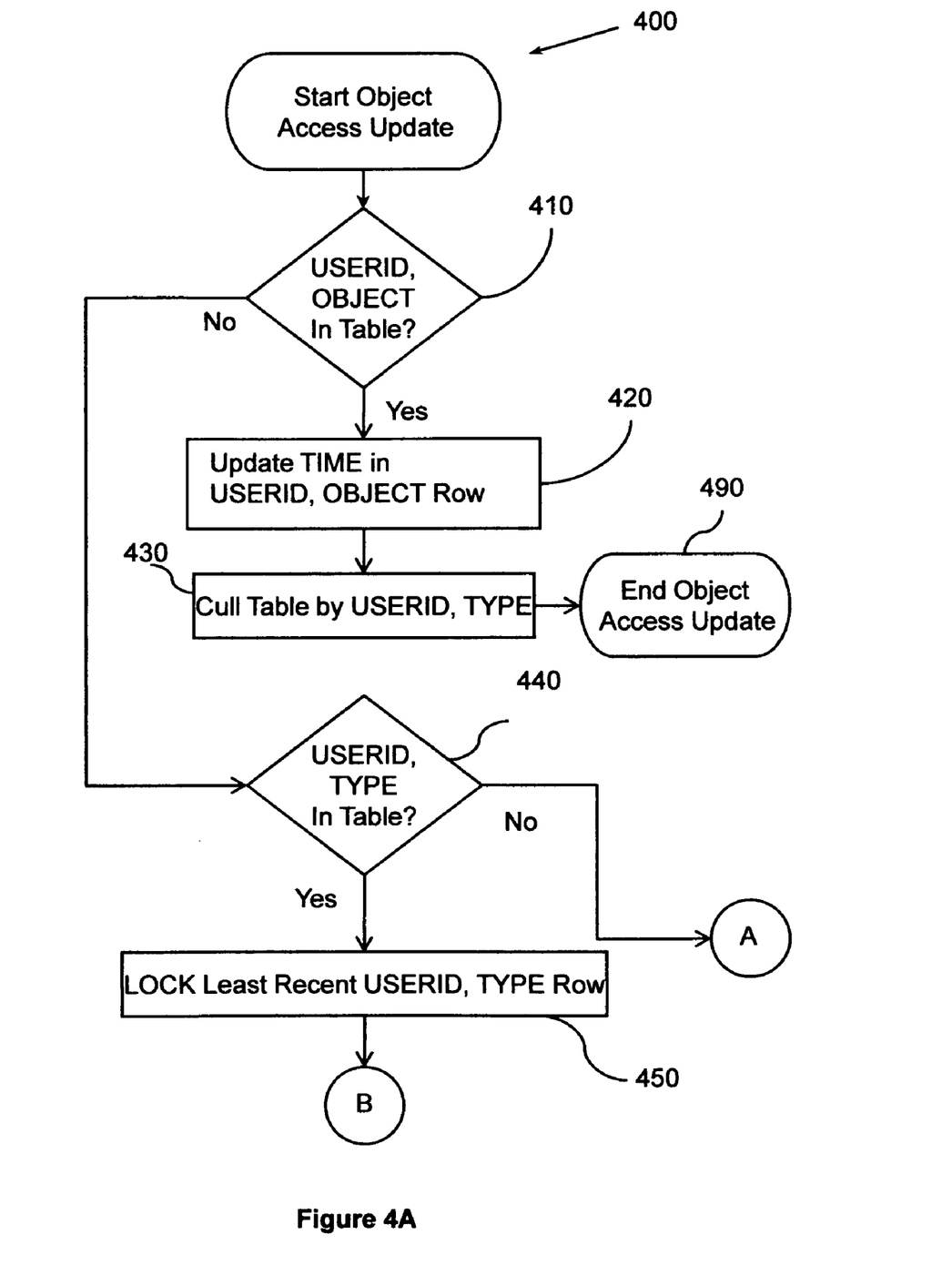
FIGS. 4A and 4B illustrate an embodiment of a method associated with recording user-to-object access events.
Figure 4B:
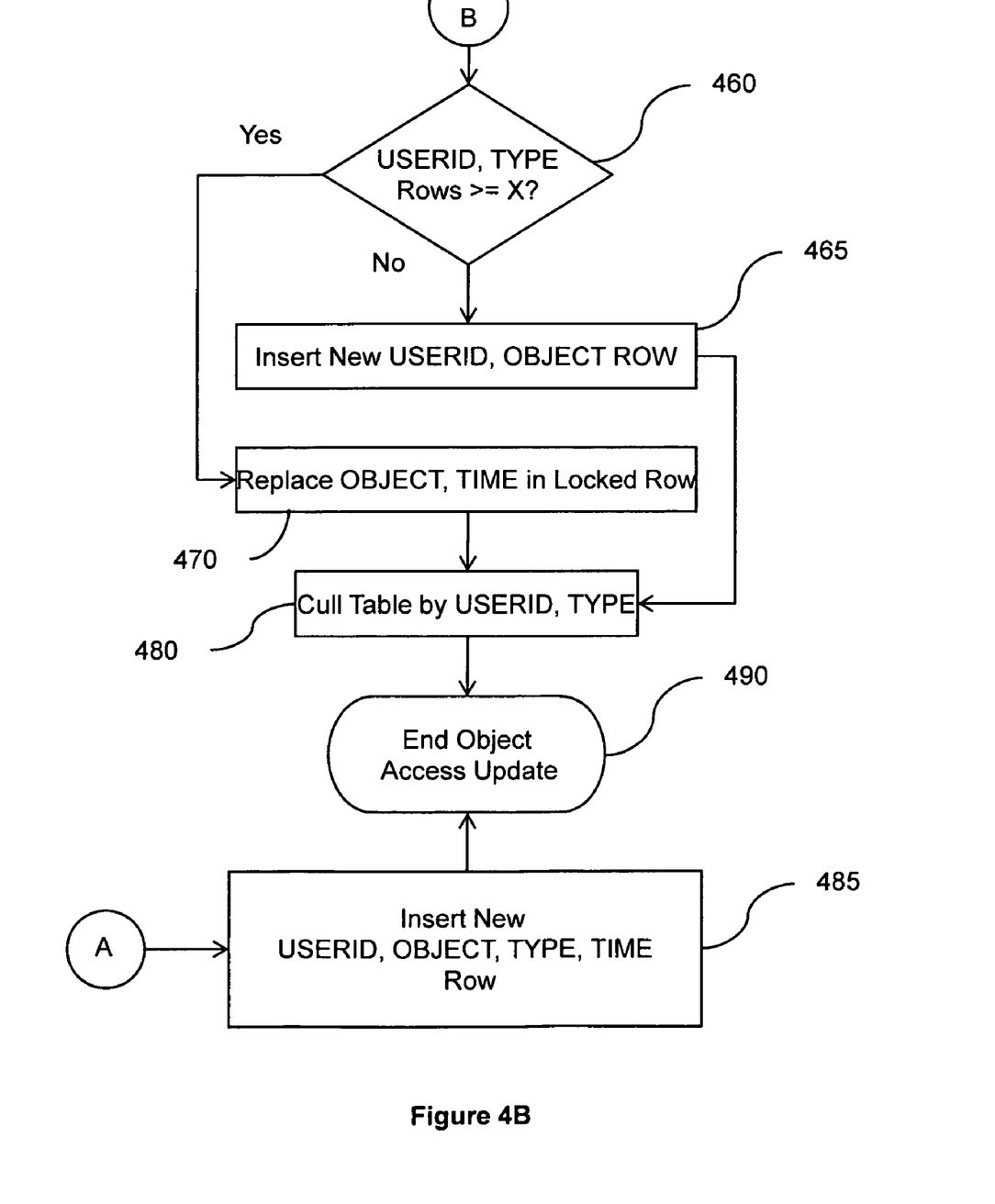

With reference to FIG. 4, one embodiment of a method 400 is illustrated for performing an object access update. As previously described, the event recorder 120 (FIG. 1) is configured to process user-to-object events for recording on a real-time basis. The method 400 will be described with reference to the example user-to-object events A-D illustrated in FIG. 2 that are represented in tuple form. The object access update method 400 (FIG. 4) is one embodiment for processing a received user-to-object access event.

Referring to FIG. 4, the method initiates when an event is received. As previously described, an event can include and/or be identified by a USER ID, OBJECT. Suppose that an event is received (e.g. event A in FIG. 2) that includes a USER ID, OBJECT of USER A, MAIL173. At 410 the object access update method determines if a row is present in the table for the event's USER ID, OBJECT. If such a row exists, at 420 a timestamp value for the existing row is updated to reflect the timestamp of the received event. Example event A in FIG. 2 would be processed in this manner. Since a row for USER A, MAIL173 is already present, the value in the existing row's TIMESTAMP column is changed to 3705641 to reflect the time stamp of event A. It is believed that the majority of events recorded (e.g. recorded by the event recorder 120) will be this type of update to a record for a prior occurrence of the received event.

In this embodiment, at 430, a culling process is performed after the existing row has been updated. The culling process counts the number of rows of the TYPE just updated and deletes a single least recent row if the number of rows is equal to or exceeds a predetermined row limit, which in the described embodiment is 10. Since there are still 11 rows having TYPE MAIL for USER A in the table, the least recent row (e.g. the row for OBJECT MAIL112) would be deleted. The use of the culling process limits the overall size of the event table so that it does not become arbitrarily large as more events occur.

If no row exists for the received event at 440, the object access update method determines whether a row for an event of the same TYPE is present in the table. If such a row exists, the least recent row having that TYPE is locally locked at 450 in manner similar to that described in conjunction with FIG. 3. Example events B and C in FIG. 2 illustrates two received events (USER A accessing DOC405) and (USER A accessing MAIL965) that have no prior occurrences recorded in the table. To process event B, the least recent row of TYPE DOC is locked, which would be the row having OBJECT DOC127. To process event C, the row having OBJECT MAIL112 would be locked.

At 460, the object access update method determines whether a number of rows having the same TYPE as the locked row is equal to or exceeds the limit. If the number of rows does not exceed the limit, at 465 the object access update method inserts a new row corresponding the received event. If the number of rows is equal to or exceeds the limit, at 470 the object access update method replaces the value for OBJECT and TIME in the locked row to correspond to the received event. Returning to example event B, since there are only three existing rows having TYPE DOC, a new row that records the event B would be inserted in the table. In the case of event C, since there are 11 rows of TYPE MAIL the locked row would be updated with the OBJECT and TIME for event C.

At 480 the object access update method culls the table as described above by counting the number of rows having the TYPE just recorded. In the example event B, no rows having TYPE DOC would be deleted due to the addition of B. In the example event C, the least recent row having TYPE MAIL would be deleted.

If no rows are present in the data store having the same OBJECT or TYPE as the received event, at 485 the method inserts a new row in the table. Example event D would be processed in this manner because there are no records for USER A accessing a TYPE PIC object.

In one embodiment, event recording is performed as follows. Each time a user accesses an object an attempt is made to UPDATE table row for the (user_id, object_id) pair using MAX(current_timestamp, table_row timestamp) as the new timestamp. The MAX operation is used in case another process has just updated the same row with a slightly later timestamp than this one. This situation may arise due to process scheduling and interruption.

If the row is not found in the UPDATE operation for this (user_id, object_id) pair then the table row for this (user_id, object_id) pair with the oldest timestamp is locked. The local lock is implemented using a SELECT_FOR_UPDATE statement that selects a (user_id, object type) pair having the oldest timestamp. In some circumstances, there can be multiple rows having the same timestamp. So that only a single row is locked the statement is constrained using ROWNUM<2 to select less than two rows so that a single row is locked. In addition, an ORDER BY statement is used so that competing processes will attempt to lock the same row in such a boundary case.

If no row for the (user_id, object type) pair is found, a new row is inserted for the object access containing (user_id, object_id, object_type, timestamp).

If a unique constraint violation occurs while the new row is being inserted then a row already exists for this (user_id, object_id) pair. This situation may arise when another process has inserted a row with the same (user_id, object_id) pair. This could happen, for example, before any rows are in the table and multiple processes try to record an object access for the same (user_id, object_id) pair. In this case, the existing row is updated using MAX (current_timestamp, table_row_timestamp) as the new timestamp.

If at least one row is found for the (user_id, object_type) pair, then a lock has been obtained on the oldest row for the (user_id, object_type) pair. The number of rows for this (user_id, object_type) pair are counted. If the row count is less than the row limit, then a new row with (user_id, object_id, object_type, timestamp) is inserted.

If a unique constraint violation occurs while the new row is being inserted then a row already exists for this (user_id, object_id) pair. In this case, the existing row is updated using MAX (current_timestamp, table_row_timestamp) as the new timestamp. This situation may arise when another process has inserted a row with the same (user_id, object_id) pair. This could happen, for example, before any rows are in the table and multiple processes try to record an object access for the same (user_id, object_id) pair.

If the oldest row for the (user_id, object_type) pair was previously locked and the row count for the pair is greater than or equal to the row limit, then the row with the oldest timestamp for this (user_id, object_type) pair is updated by overwriting the object_id and timestamp fields with the current information. In this manner, the oldest existing row is recycled to be used as the newest access recorded for this (user_id, object_type) pair.

If a unique constraint violation occurs while the oldest row is being updated then a row already exists for this (user_id, object_id) pair. In this case, the existing row is updated using MAX (current_timestamp, table_row_timestamp) as the new timestamp. This situation may arise when another process has inserted a row with the same (user_id, object_id) pair. This could happen, for example, before any rows are in the table and multiple processes try to record an object access for the same (user_id, object_id) pair.

If, after performing either a new row insert or an update on the oldest row, the (user_id, object_type) row count is greater than the row limit, the row that now has the oldest timestamp for this (user_id, object type) pair is deleted. So that only a single row is deleted the statement is constrained using ROWNUM<2 to select less than two rows so that a single row is deleted. In addition, an ORDER BY statement is used so that competing processes will attempt to delete the same row.

In this manner, error handling logic comes into play when a unique constraint violation occurs upon an INSERT or UPDATE operation. The unique constraint violation indicates that there is an existing row that wasn't in the table when the event recording method first checked. The error handling logic attempts to update the newly discovered existing table row. The error handling logic is helpful because it deals with issues arising from a concurrent environment.

It is believed that in most circumstances an existing row for the current (user_id, object_id) pair or the oldest row for the current (user_id, object_type) will be updated. In these common cases the row count is checked for the (user_id, object_type) pair and the oldest row is deleted if the row limit is exceeded. In this manner, with continual usage of the system the exceptional case in which the number rows for a given (user_id, object_type) exceeds the limit will be corrected as users continue to access the system. Examples of how the system could be in a state where the number of rows for a (user_id, object_type) pair exceeds the row limit are if multiple processes perform inserts while the system is temporarily under the row limit of if the row limit is lowered by an outside actor.

While FIGS. 3 and 4 illustrate various actions occurring in serial, it is to be appreciated that various actions illustrated in FIGS. 3 and 4 could occur substantially in parallel. By way of illustration, a first process could search for an existing EVENT record, a second process could attempt to lock the oldest EVENT TYPE record, and a third process could hold the lock on the EVENT TYPE record and update the locked EVENT TYPE record. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform a method that records events, such as, for example, user-to-object accesses. While executable instructions associated with the above method are described as being stored on a computer-readable medium, it is to be appreciated that executable instructions associated with other example methods described herein may also be stored on a computer-readable medium.

Figure 5:
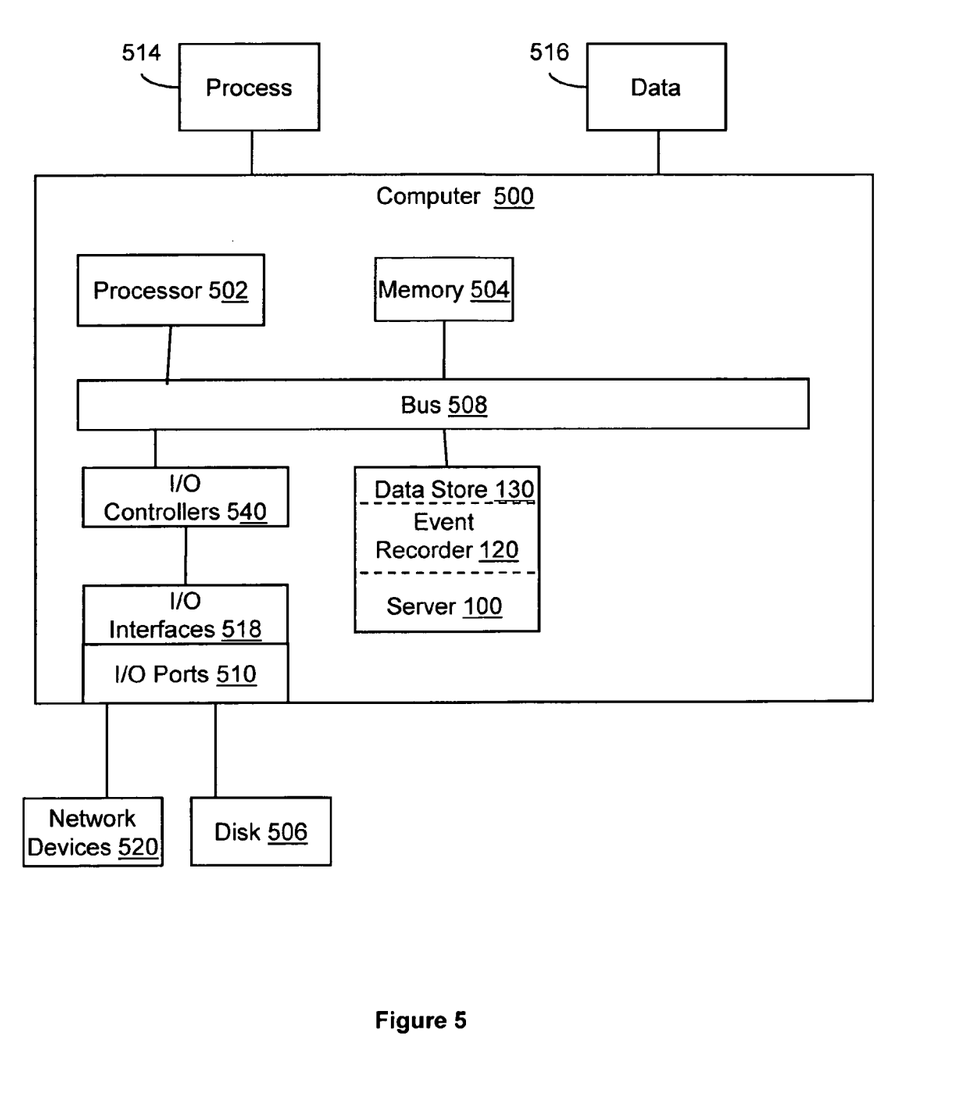
FIG. 5 illustrates an embodiment of an example computing environment in which example systems and methods, and equivalents, may operate.

FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, the computer 500 may include an event data store 130 (FIG. 1) and an event recorder 120 (FIG. 1) configured to record events real time. In different examples, the event recorder 120 may be implemented in hardware, software, firmware, and/or combinations thereof. While the event recorder 120 is illustrated as a component within a server 100, it is to be appreciated that in one example, the event recorder 120 could be implemented in another location.

Thus, the event recorder 120 may provide means (e.g., hardware, software, firmware) for recording events real time. The means may be implemented, for example, as an ASIC programmed to record events real time. The means may also be implemented as computer executable instructions that are presented to computer 500 as data 516 that are temporarily stored in memory 504 and then executed by processor 502.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

What is claimed is:

1. A computer-implemented method that records occurrences of events as records in an event data store, where each event is classified by an event identifier and an event type, the method comprising:
    receiving an event for recording;
    determining if a record for a prior occurrence of the received event is present in the event data store; and
    if no record for a prior occurrence of the received event is present,
        identifying a record in the event data store corresponding to a least recent occurrence of an event having the same event type as the received event;
        locally locking the identified record; and
        updating the event data store to record the received event while the identified record is locked.

2. The computer-implemented method of claim 1 where while the identified record is locally locked, access to other records in the event data store is allowed.

3. The computer-implemented method of claim 1 where updating the event data store is performed by modifying the locked record to correspond to the received event.

4. The computer-implemented method of claim 1 further comprising culling the event data store by:
    counting a number of records having the same event type as the received event; and
    deleting at least one record if the number of records is equal to or exceeds a predetermined limit.

5. The computer-implemented method of claim 4 where the culling is performed in instances when an event of the same event type as the received event is present in the event data store.

6. The computer-implemented method of claim 4 where deleting at least one record is performed by deleting at least one record in the counted records corresponding to a least recent event.

7. The computer-implemented method of claim 1 where the events comprise a user-to-object access occurring at a chronological time and where the event type classifies a type of object.

8. The computer-implemented method of claim 7 where the event data store comprises an object access table having attributes corresponding to a user identifier, object identifier, object type, and a timestamp for the user-to-object access.

9. The computer-implemented method of claim 1 further comprising inserting a new record into the event data store when no record corresponding to an event having the same event type as the received event is present in the event data store.

10. The computer-implemented method of claim 1 further comprising updating a record for a prior occurrence of the received event to correspond to the received event when a record for a prior occurrence of the received event is present in the event data store.

11. A computing system configured to record occurrences of events, where each event is classified by an event identifier and an event type, the computing system comprising:
    an event memory configured to store records where each record corresponds to an event;
    an event recorder configured to receive event data related to a received event, determine if a record for a prior occurrence of the received event is present in the memory, and to record the event data as a record in the and
    a local lock that is actuable by the event recorder upon a determination that a prior occurrence of the received event is not present in the memory, the lock being configured to locally lock a least recent record identified as having a same event type as the received event;
    where the event recorder is configured to update the locked record to correspond to the received event while the identified record is locked.

12. The computing system of claim 11 where access to other records in the event memory is allowed while the identified least recent record is locally locked.

13. The computing system of claim 11 where the events are user-to-object accesses.

14. The computing system of claim 13 where the event memory comprises an object access table having attributes corresponding to a user identifier, object identifier, object type, and a time stamp for the user-to-object access.

15. The computing system of claim 14 where the local lock is configured to lock a row in the object access table having the same user identifier and object type as the received event and where the event recorder is configured to modify the locked row such that it corresponds to the event data of the received event.

16. The computing system of claim 11 where the event recorder is configured to insert a new record into the event memory when no record corresponding to an event having the same event type as the received event is present in the event memory.

17. The computing system of claim 11 where the event recorder is configured to update a record corresponding to a prior occurrence of the received event when a record for a prior occurrence of the received event is present in the event memory.

18. The computing system of claim 11 further comprising an event memory culler configured to count a number of records having the same event type as the received event and to delete at least one record if the number of records is equal to or exceeds a predetermined limit.

19. The computing system of claim 18 where the event memory culler is configured to delete at least one record in the counted records corresponding to a least recent event.

20. A non-transitory computer-readable medium storing computer-executable instructions that when executed by a computer cause the computer to perform a method that records occurrences of events as records in an event data store, where each event is classified by an event identifier and an event type, the method comprising:
receiving an event for recording;
determining if a record for a prior occurrence of the received event is present in the event data store; and
if no record for a prior occurrence of the received event is present,
identifying a record in the event data store corresponding to a least recent event having the same event type as the received event;
locally locking the identified record while allowing access to other records in the event data store; and
updating the event data store to record the received event while the identified record is locked.

21. The non-transitory computer-readable medium of claim 20 where updating the event data store is performed by modifying the locked record to correspond to the received event.

22. The non-transitory computer-readable medium of claim 20 where the computer-executable instructions comprise instructions for culling the event data store by:
counting a number of records having the same event type as the received event; and
deleting at least one record if the number of records is equal to or exceeds a predetermined limit.

23. The non-transitory computer-readable medium of claim 22 where deleting at least one record is performed by deleting at least one record in the counted records corresponding to a least recent event.

24. The non-transitory computer-readable medium of claim 22 where the computer-executable instructions for culling the event data store are performed in instances when an event of the same event type as the received event is present in the event data store.

25. The non-transitory computer-readable medium of claim 20 where the events comprise a user-to-object access occurring at, a chronological time and where the event type classifies a type of object.

26. The non-transitory computer-readable medium of claim 25 where the event data store comprises an object access table having attributes corresponding to a user identifier, object identifier, object type, and a timestamp for the user-to-object access.

27. The non-transitory computer-readable medium of claim 20 where the computer-executable instructions comprise inserting a new record into the event data store when no record corresponding to an event having the same event type as the received event is present in the event data store.

28. The non-transitory computer-readable medium of claim 20 where the computer-executable instructions comprise updating a record for a prior occurrence of the received event to correspond to the received event when a record for a prior occurrence of the received event is present in the event data store.

* * * * *

UNITED STATES PATENT AND TRADEMARK OFFICE
CERTIFICATE OF CORRECTION

| | | |
|---|---|---|
| PATENT NO. | : 8,095,520 B2 | Page 1 of 1 |
| APPLICATION NO. | : 12/290718 | |
| DATED | : January 10, 2012 | |
| INVENTOR(S) | : Evans | |

It is certified that error appears in the above-identified patent and that said Letters Patent is hereby corrected as shown below:

In column 10, line 46, in Claim 11, delete "in the and" and insert -- in the event memory; and --, therefor.

In column 12, line 21, in Claim 25, delete "at," and insert -- at --, therefor.

Signed and Sealed this
Twenty-seventh Day of March, 2012

David J. Kappos
*Director of the United States Patent and Trademark Office*